US007775032B2

(12) United States Patent
Hauer et al.

(10) Patent No.: US 7,775,032 B2
(45) Date of Patent: *Aug. 17, 2010

(54) METHOD OF OPERATING AN EXHAUST NOZZLE ASSEMBLY

(75) Inventors: Thomas Anthony Hauer, West Chester, OH (US); Cy W. Overbeck, Hamilton, OH (US)

(73) Assignee: General Electric Company, Schenectady ( * ) Notice: Subject to any disclaimer, the term of this patent is extended or adjusted under 35 U.S.C. 154(b) by 752 days.

This patent is subject to a terminal disclaimer.

(21) Appl. No.: 11/646,017

(22) Filed: Dec. 27, 2006

(65) Prior Publication Data

US 2008/0155960 A1 Jul. 3, 2008

(51) Int. Cl.
*F02K 3/02* (2006.01)
(52) U.S. Cl. .................................. 60/226.2; 60/226.1
(58) Field of Classification Search ............... 60/204, 60/226.2, 229, 771; 239/265.27, 265.29, 239/265.32, 265.33
See application file for complete search history.

(56) References Cited

U.S. PATENT DOCUMENTS

| | | | |
|---|---|---|---|
| 4,605,169 A * | 8/1986 | Mayers | 239/265.29 |
| 5,092,525 A | 3/1992 | Roach et al. | |
| 5,794,434 A | 8/1998 | Szupkay | |
| 6,546,715 B1 * | 4/2003 | Blevins et al. | 60/226.2 |
| 6,663,042 B2 * | 12/2003 | Hatrick et al. | 244/110 B |
| 6,938,408 B2 | 9/2005 | Lair | |
| 2005/0229586 A1 | 10/2005 | Whurr | |

* cited by examiner

*Primary Examiner*—Michael Cuff
*Assistant Examiner*—Young Choi
(74) *Attorney, Agent, or Firm*—Marcella R. Louke; William Scott Andes; General Electric Co.

(57) ABSTRACT

A method of operating an exhaust nozzle assembly includes translating a translatable structure between a plurality of operational positions to open and close a flow diverting port extending in an exhaust duct. The longitudinal position of a throat constriction varies with translation of the translatable structure. Additionally, the cross-sectional area of the exhaust duct at the throat constriction may vary with translation of the translatable structure. An exemplary exhaust nozzle is operable in-flight for providing at least partial reverse thrust to at least partly control the velocity of an aircraft. An exemplary exhaust nozzle is operable on the ground to spoil ground idle thrust.

12 Claims, 7 Drawing Sheets

METHOD OF OPERATING AN EXHAUST NOZZLE ASSEMBLY

BACKGROUND OF THE INVENTION

This invention relates generally to an exhaust nozzle assembly having a flow diverting port in an exhaust duct for directing the flow of exhaust gases from a gas turbine engine.

Two-dimensional variable area exhaust nozzles for gas turbine engines are known in the art. Two-dimensional nozzles including thrust reversing capability as well as a variable nozzle exit area are shown, for example, in U.S. Pat. Nos. 4,013,226; 4,052,007; 4,375,276; and 5,092,525. However, the disclosed nozzles employ complicated mechanical systems. Thus, a need exists for a simplified exhaust nozzle having thrust reversing capability, variable nozzle exit area capability, and improved cruise efficiency.

BRIEF DESCRIPTION OF THE INVENTION

The above-mentioned need or needs may be met by exemplary embodiments that provide a method of operating an exhaust nozzle assembly. An exemplary method includes translating a translatable structure between a plurality of operational positions relative to a pair of longitudinally extending sidewalls and a bottom wall of an exhaust duct having a flow diverting port therein. The translatable structure is operable to open and close the flow diverting port. The plurality of operational positions includes a first operational position wherein the flow diverting port is effectively fully closed, a second operational position wherein the flow diverting port is effectively fully opened, and first intermediate position intermediate the first and second operational positions wherein the flow diverting port is effectively fully closed. In the exemplary method, during at least a part of the translating step, a cross-sectional area of the exhaust duct at a throat constriction in the exhaust duct is varied, wherein the throat constriction is at least partly defined by an inner portion of the translatable structure.

An exemplary method includes translating a translatable structure between a plurality of operational positions relative to a pair of longitudinally extending sidewalls and a bottom wall of an exhaust duct having a flow diverting port therein. The translatable structure is operable to open and close the flow diverting port. The plurality of operational positions includes a first operational position wherein the flow diverting port is effectively fully closed and a second operational position wherein the flow diverting port is effectively fully opened. The method includes, during at least a part of the translating step, translating the translatable structure from the first operational position to a first intermediate operational position intermediate the first and second operational positions wherein the flow diverting port is effectively fully closed. The method further includes, during at least a part of the translating step, translating the translatable structure into a second intermediate operational position intermediate the first and second operational positions wherein the flow diverting port is partly opened.

An exemplary method includes translating a translatable structure between a plurality of operational positions relative to a pair of longitudinally extending sidewalls and a bottom wall of an exhaust duct having a flow diverting port therein. The translatable structure is operable to open and close the flow diverting port. The plurality of operational positions includes a first operational position wherein the flow diverting port is effectively fully closed and a second operational position wherein the flow diverting port is effectively fully opened. The method includes, during at least a part of the translating step, translating the translatable structure into a first intermediate operational position intermediate the first and second operational positions wherein the flow diverting port is effectively fully closed. The method includes, during at least a part of the translating step, varying a cross-sectional area of the exhaust duct at a throat constriction, wherein the throat constriction is at least partly defined by an inner portion of the translatable structure.

An exemplary method includes receiving exhaust gases from an engine of an aircraft into an exhaust duct of an aircraft. During at least a part of the receiving step, the translatable structure is translated into an intermediate operational position, wherein the flow diverting port is partly open and at least a portion of the exhaust gases is directed through the flow diverting port. During at least a part of the translating step, the diverted portion of the exhaust gases is utilized at least in part to control an in-flight velocity of the aircraft.

An exemplary method includes directing the flow of gases in a two-dimensional exhaust nozzle assembly for an engine of an aircraft. The method includes receiving exhaust gases from an engine of an aircraft into an exhaust duct. During at least a part of the receiving step, the translatable structure is translated into a second intermediate operational position wherein a flow diverting port in the exhaust duct is partly open and at least a portion of the exhaust gases is directed through the flow diverting port. During at least a part of the translating step, the portion of the exhaust gases is utilized at least in part to control ground idle thrust of the aircraft.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
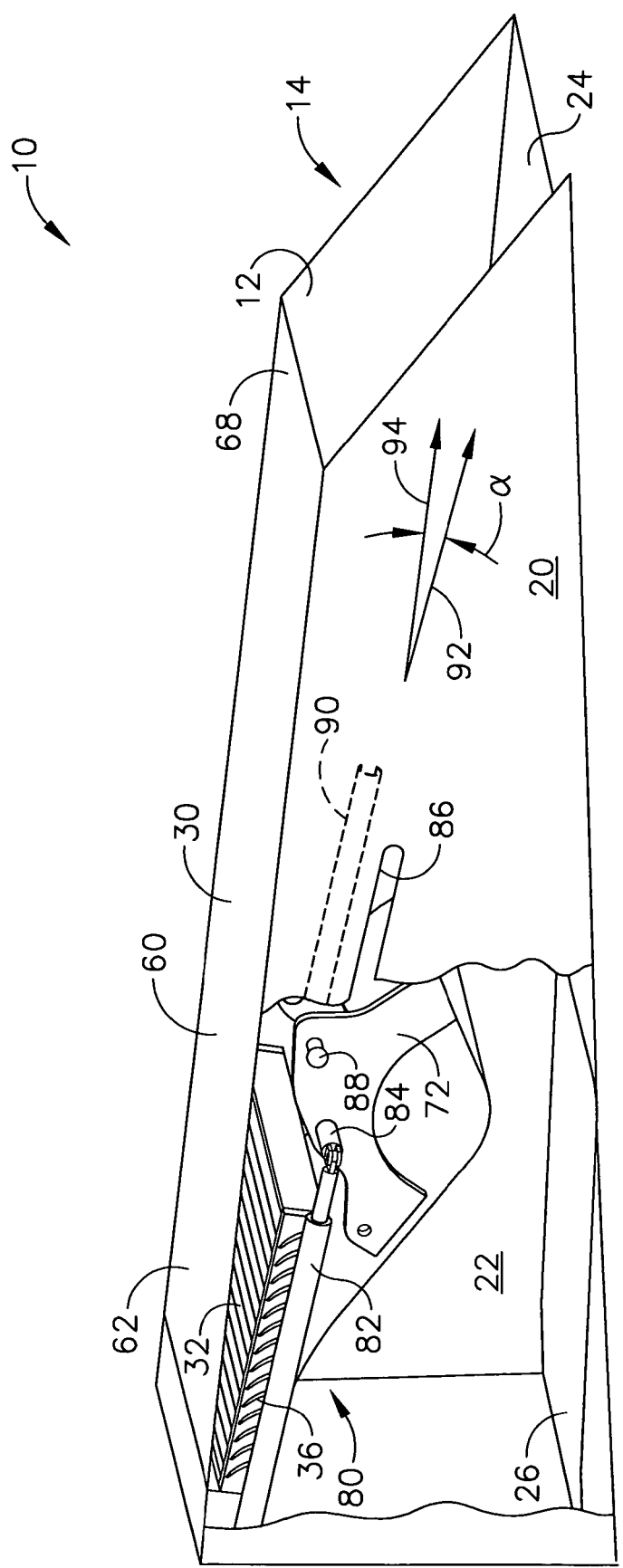
FIG. 1 is an isometric view, partly broken away, of an exemplary exhaust nozzle assembly.

Referring to the drawings wherein identical reference numerals denote the same elements throughout the various views. FIG. 1 shows an exemplary embodiment includes an engine nozzle assembly 10 for directing the flow of gases from a gas turbine engine. The exemplary nozzle assembly may be utilized to direct the flow of engine exhaust or a mixed flow exhaust, hereinafter, "exhaust gases." In particular the engine nozzle assembly 10 is preferably a two-dimensional or rectangular cross-sectioned nozzle. The engine nozzle assembly 10 includes a generally longitudinally extending exhaust duct 12 for channeling exhaust gases. As is known in the art, the nozzle assembly may include a substantially circular inlet (not shown) for attachment to an upstream engine component. The nozzle assembly 10 includes a generally rectangular outlet 14.

In an exemplary embodiment, the nozzle assembly 10 includes first and second opposed longitudinally extending sidewalls 20, 22 having a bottom wall 24 extending therebetween. In an exemplary embodiment, the bottom wall 24 includes an upper surface 26 which may be contoured. The exhaust duct 12 has an upper boundary, defined at least in part by a translatable structure 30. The exhaust duct 12 includes at least one flow diverting port 32 therein which, when opened, allows flow communication between the interior of the exhaust duct and the surrounding ambient atmosphere. In an exemplary embodiment, a plurality of flow directing structures 36 extend in the flow diverting port 32 to direct exhaust gases generally forward and outward.

Figure 2:
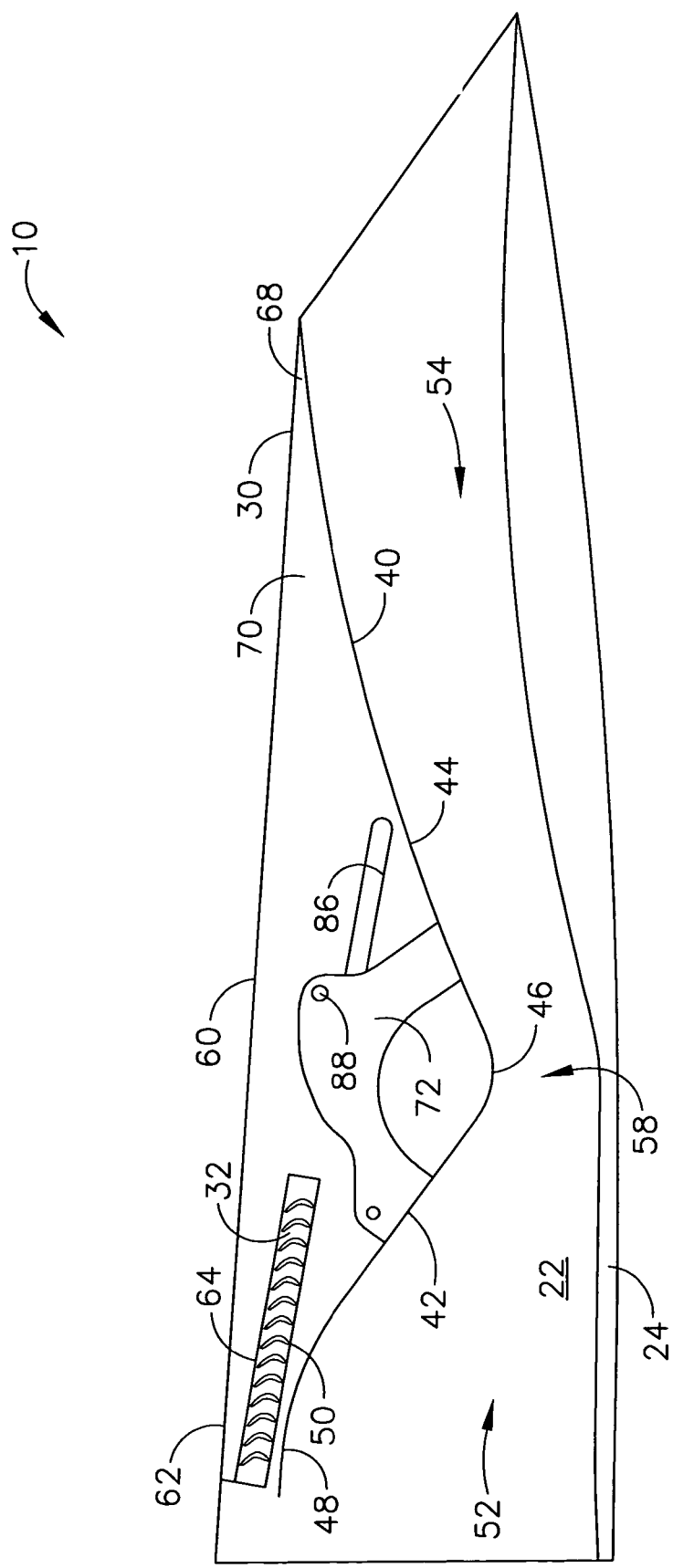
FIG. 2 is a side view of an exemplary nozzle assembly without showing a first sidewall.

In an exemplary embodiment, the translatable structure 30 is operable to open and close the flow diverting port 32 in the exhaust duct 12 as explained in greater detail below. With reference to FIG. 2, in an exemplary embodiment, the translatable structure 30 includes an inner portion 40 having a forward region 42 and a rearward region 44. The forward and rearward regions meet at an inwardly extending bump, also referred to as inner edge 46. Inner edge 46 extends transversely between the first and second sidewalls 20, 22. In an exemplary embodiment, the forward region 42 includes an inner door portion 48 adapted to cover and uncover an inlet 50 of the flow diverting port 32.

In an exemplary embodiment, the forward region 42 of inner portion 40 cooperates with the sidewalls 20, 22 and bottom wall 24 to at least partly define a generally converging exhaust duct region 52. In an exemplary embodiment, the rearward region 44 of inner portion 40 cooperates with the sidewalls 20, 22 and bottom wall 24 to at least partly define a generally diverging exhaust duct region 54.

In an exemplary embodiment, the inner edge 46 at least partly defines a throat constriction 58 in the exhaust duct 12. As explained in greater detail below, in an exemplary embodiment, the longitudinal position of the throat constriction 58 is variable and dependent upon translation of the translatable structure.

In an exemplary embodiment, the translatable structure 30 also includes an outer portion 60 including at least an outer door portion 62. The outer door portion 62 is adapted to cover and uncover an outlet 64 of the flow diverting port 32. In an exemplary embodiment, the inner portion 40 and the outer portion 60 comprise an integral structure joined at a rearward end 68 and defining a generally hollow space 70 therebetween.

In an exemplary embodiment, the translatable structure 30 also includes at least one brace member 72. In an exemplary embodiment, the translatable structure may include two or more transversely spaced brace members. In an exemplary embodiment, the brace member 72 is mounted in supporting connection with at least the inner portion 40 and extends in the generally hollow space 70 between the inner and outer portions 40, 60. In an exemplary embodiment, the brace member 72 extends in the hollow space 70 substantially opposite the inner edge 46.

Figure 3:
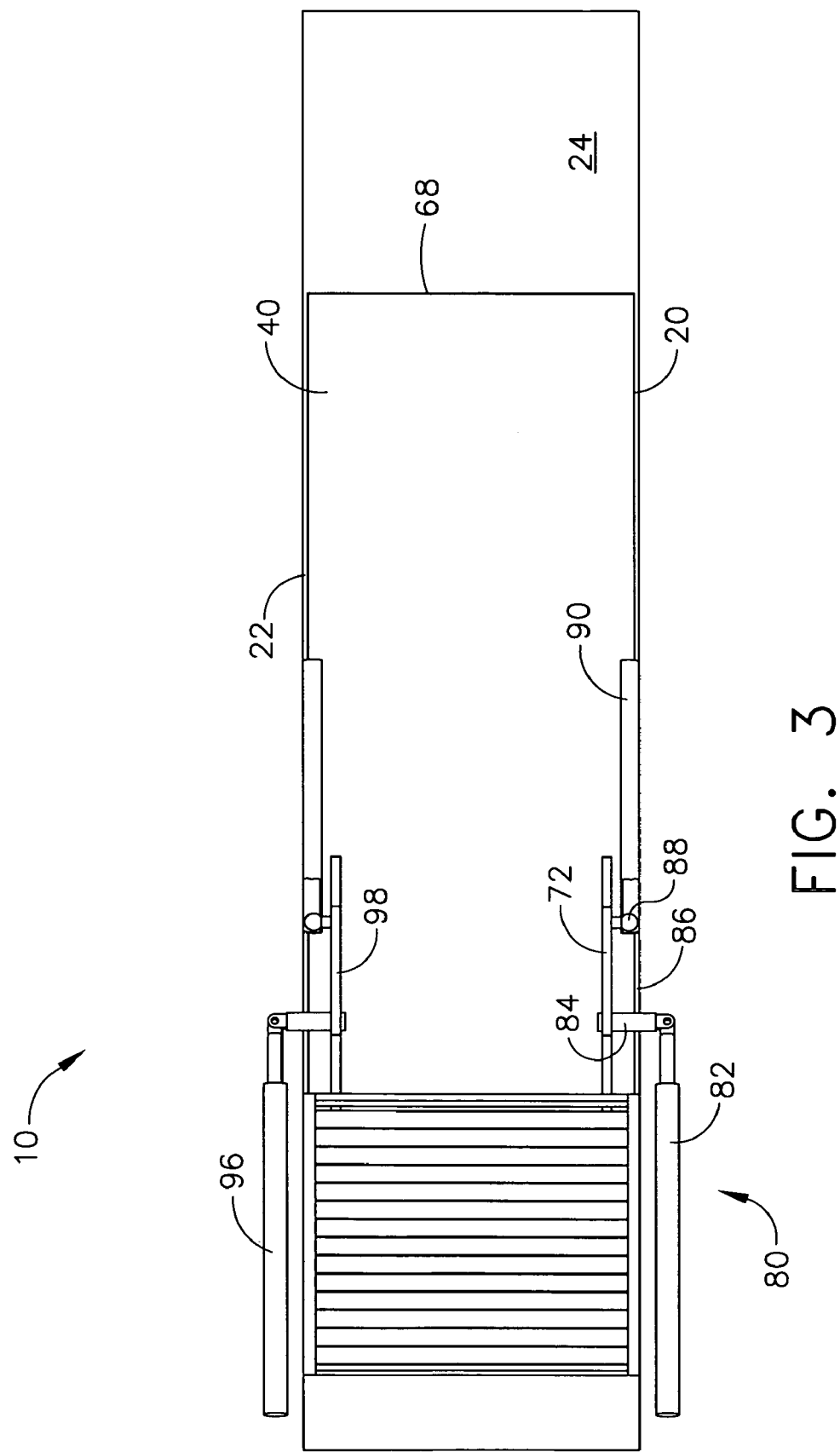
FIG. 3 is a top view of an exemplary nozzle assembly without showing an upper portion of a translatable structure.

With reference to FIGS. 1 and 3, in an exemplary embodiment, the brace member 72 in operative connection with an actuation system 80. The exemplary actuation system is mounted in supporting connection with at least one sidewall 20. The exemplary actuation system 80 includes at least one linear actuator 82 and a connector 84 extending between the linear actuator 82 and the brace member 72. In an exemplary embodiment, the connector 84 extends through a longitudinally extending slot 86 in the sidewall 20. A cam follower 88 extends from the brace 72 and is adapted for movement within a first cam track 90.

As shown in FIG. 1, in an exemplary embodiment, the linear actuator 82 is adapted for movement along a line 92 that is oriented at an angle α (angle alpha) with respect to a generally longitudinally extending line 94. In an exemplary embodiment, the first cam track 90 is disposed in generally parallel relationship to line 92. FIG. 3 illustrates an exemplary embodiment in which the actuation system includes a second linear actuator 96 mounted in supporting connection with the second sidewall 22 and in operative connection with a second brace member 98 in like manner. In an exemplary embodiment, the first and second linear actuators 82, 96 are adapted for coordinated movement.

The disclosed arrangement for supporting and translating the translatable structure 30 is merely exemplary and other arrangements may be utilized to accomplish the desired outcomes.

Figure 4:
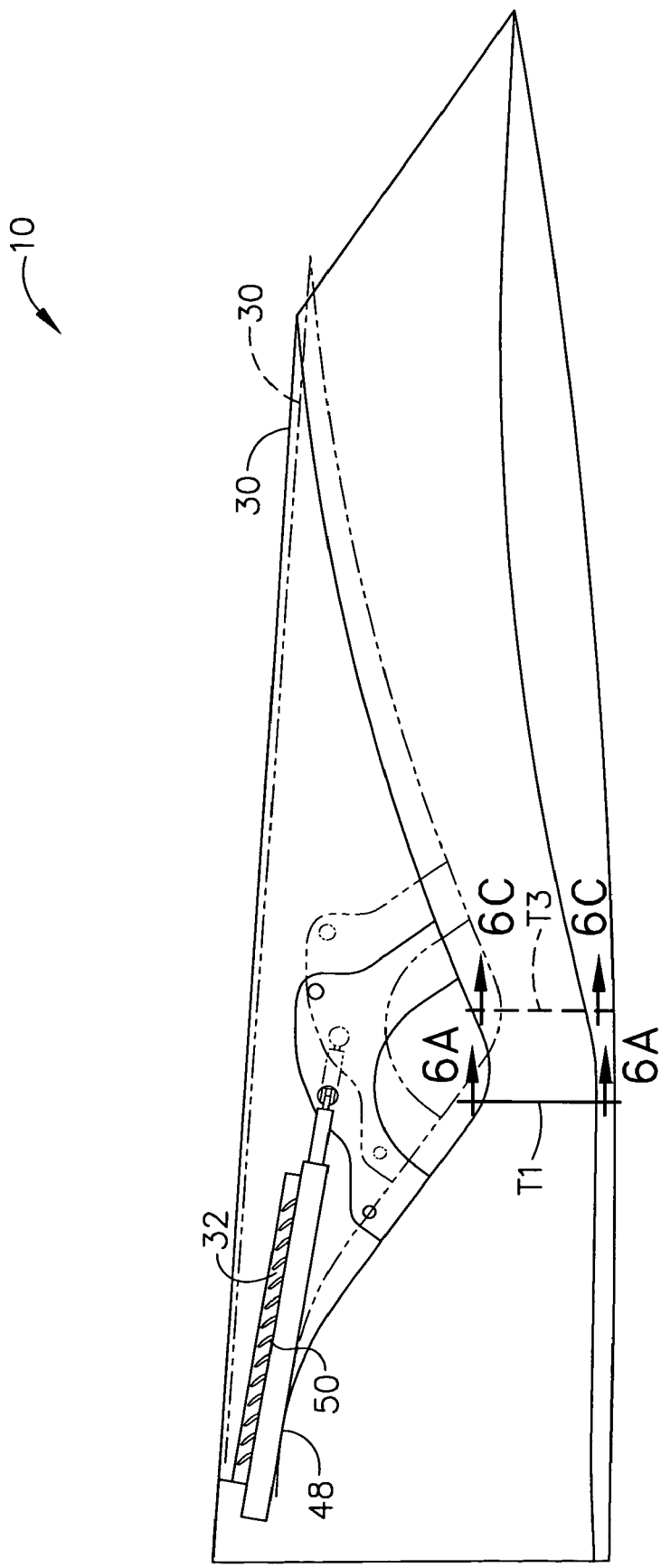
FIG. 4 is a schematic representation showing a translatable structure in a first operational position and a first intermediate operational position.
Figure 5:
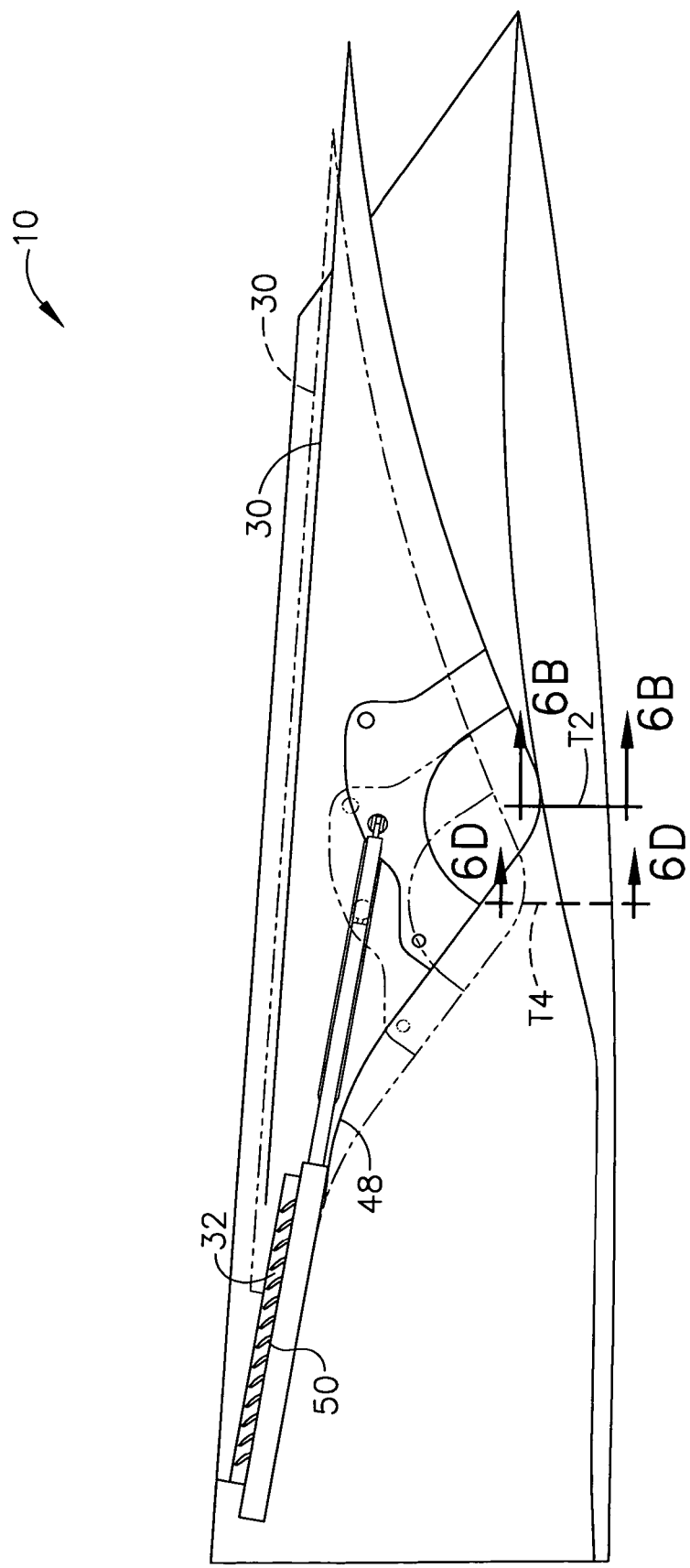
FIG. 5 is a schematic representation showing a translatable structure in a second operational position and a second intermediate operational position.
Figure 6A:
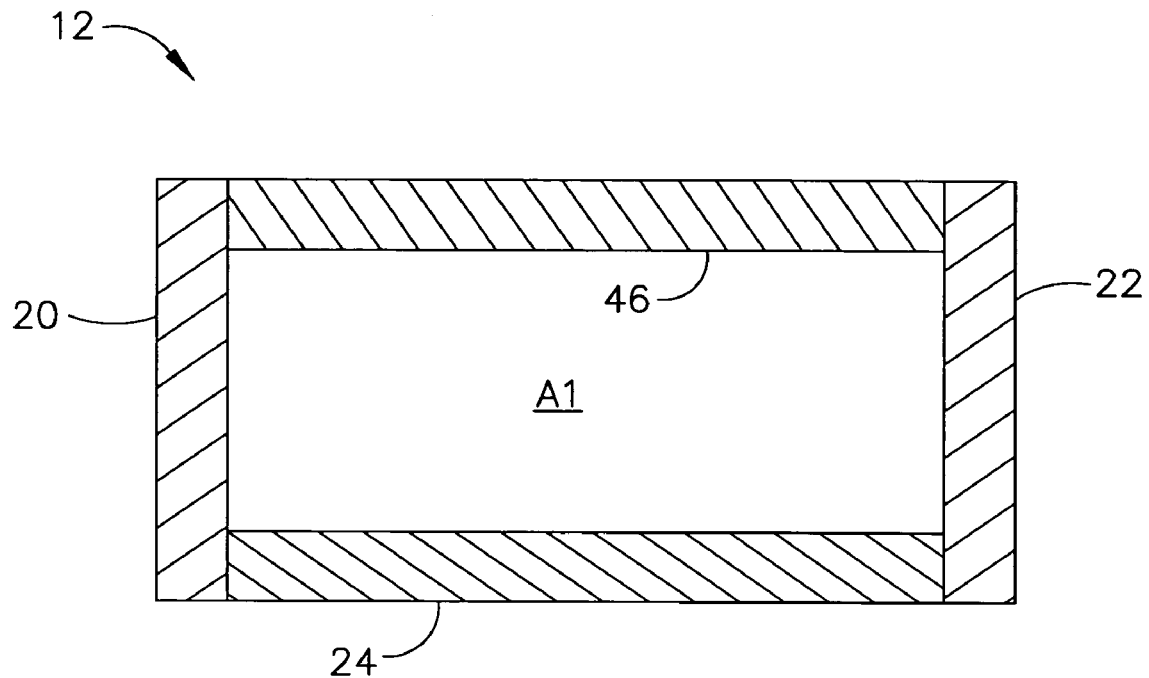
FIG. 6A is a cross-sectional view of an exemplary exhaust duct when a translatable structure is in a first operational position.
Figure 6B:
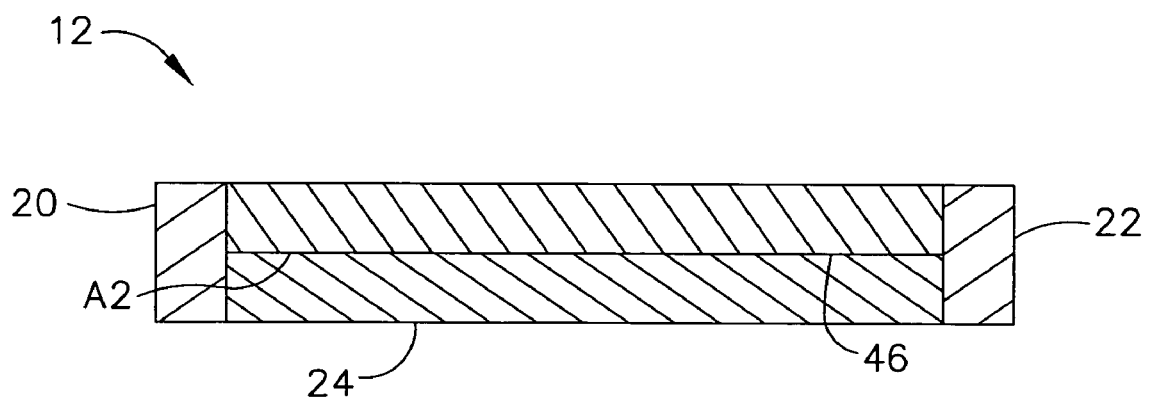
FIG. 6B is a cross-sectional view of an exemplary exhaust duct when a translatable structure is in a second operational position.
Figure 6C:
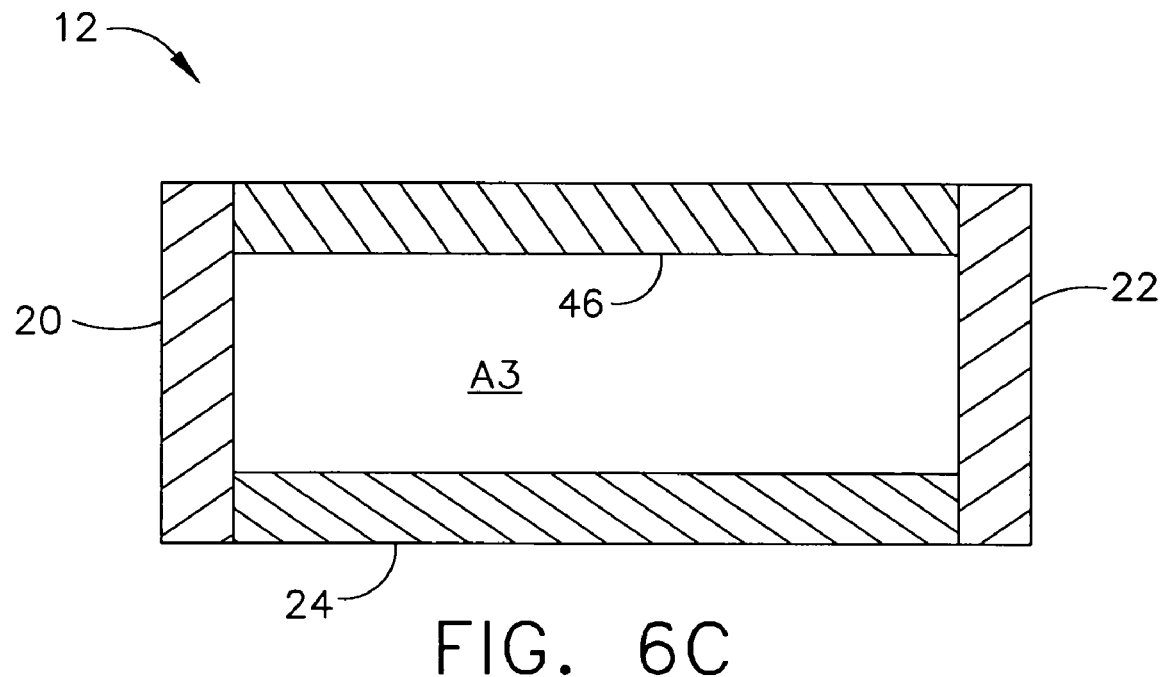
FIG. 6C is a cross sectional view of an exemplary exhaust duct when a translatable structure is in a first intermediate operational position.
Figure 6D:
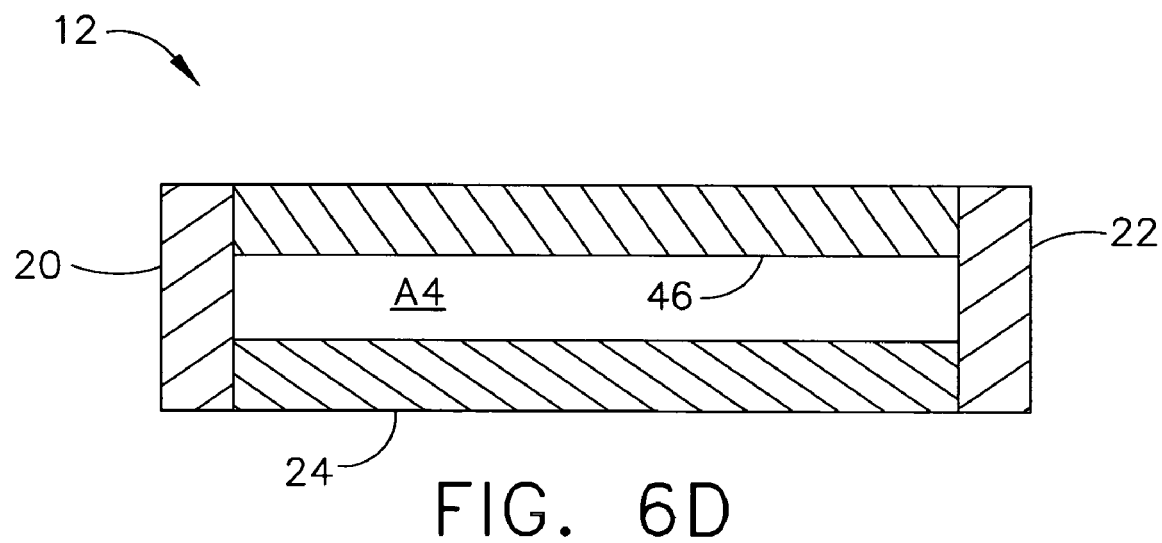
FIG. 6D is a cross-sectional view of an exemplary exhaust duct when a translatable structure is in a second intermediate operational position.

The operation of the nozzle assembly is described with particular reference to FIGS. 4, 5 and 6. In operation, the translatable structure 30 is selectively positionable in one of a plurality of operational positions. A first operational position is defined as when the translatable structure 30 is in a forward-most position. When the translatable structure 30 is in the first operational position, the flow diverting port 32 is fully closed. By "fully closed" it is meant that substantially none of the exhaust gases flows through the flow diverting port 32 due to the inlet 50 being substantially covered by the inner door portion 48. Thus, substantially all of the exhaust gases are directed through the nozzle outlet 14. When the translatable structure 30 is in the first operational position, the throat constriction 58 is at a longitudinally forward-most position, T1, and the cross-sectional area, A1, of the exhaust duct 12 at the throat constriction 58 is maximized.

A second operational position is defined as when the translatable structure 30 is in a rearward-most position. When the translatable structure is in the second operational position, the flow diverting port 32 is fully opened. By "fully opened" it is meant that inlet 50 is substantially uncovered from the inner door portion 48. When the translatable structure 30 occupies the second operational position, the throat constriction 58 is at a longitudinally rearward-most position, T2, and the cross-sectional area, A2, of the exhaust duct 12 at the throat constriction 58 is minimized. In an exemplary embodiment, when the translatable structure is in the second operational position, the inner edge 46 contacts or nearly contacts the upper surface 26 of bottom wall 24. When the translatable structure is in the second operational position, substantially all of the exhaust gases are directed through the flow diverting port 32.

A first intermediate operational position is defined as when the translatable structure 30 occupies a position between the first and second operational positions and the flow diverting port 32 is fully closed. When the translatable structure 30 occupies the first intermediate operational position, the position, T3, of the throat constriction 58 is rearward of T1. When the translatable structure is in the first intermediate operational position, substantially all of the exhaust gases are directed through the nozzle outlet 14. However, the cross-sectional area, A3, of the exhaust duct 12 at the throat constriction 58 is less than the maximum area, A1. Thus, the nozzle assembly provides for some rearward translation of the translatable structure 30 away from the first operational position without opening inlet 50.

In an exemplary embodiment, translation of the translatable structure 30 between the first operational position and the first intermediate operational position varies the longitudinal position of the throat constriction 58 without changing the overall direction of flow of exhaust gases, i.e., no flow reversal. Additionally, in an exemplary embodiment, the distance between the throat constriction 58 and the bottom wall 24 varies with translation of the translatable structure 30. Thus, the cross-sectional area of the exhaust duct at the throat constriction 58 varies with translation of the translatable structure 30. Thus, in an exemplary embodiment, the translatable structure 30 is associated with two-dimensional movement. The positioning of the throat constriction 58, and the associated cross-sectional area may be varied so as to enhance operational efficiency of the engine.

A second intermediate operational position is defined between the first intermediate operational position and the second operational position. When the translatable structure 30 is in the second intermediate operational position, the flow diverting port 32 is partly opened, such that only a portion of the inlet 50 is covered by the inner door portion 48. When the translatable structure occupies the second intermediate operational position, the position, T4, of the throat constriction 58 is rearward of T3. At least a portion of the exhaust gases are directed through the flow diverting port 32 when the translatable structure is in the second intermediate operational position. In an exemplary embodiment, when the translatable structure occupies the second intermediate operational position, the cross-sectional area, A4, at the throat constriction 58 is less than the maximum area, A1.

In an exemplary embodiment, the rearward end 68 cooperates with sidewalls 20, 22 and bottom wall 24 to form outlet 14. Translation of the translatable structure 30 is thus operable to change the configuration of outlet 14. For example, in an exemplary embodiment, generally rearward and inward translation of the translatable structure is operable to decrease the outlet area.

In an exemplary embodiment, the translatable structure 30 is adapted for in-flight translation. Translation of the translatable structure between at least the first operational position and the first intermediate operational position provides opportunities to affect thrust, back flow pressure, and engine efficiency by varying the configuration of the exhaust duct, especially at the throat constriction 58 and the nozzle outlet 14. In an exemplary embodiment, translation of the translatable structure into the second intermediate operational position allows in-flight diversion of at least a portion of the exhaust gases in generally forward and outward directions. The diversion of exhaust gases may be utilized at least in part to control the in-flight velocity of the aircraft.

In an exemplary embodiment, the translatable structure 30 is utilized to provide at least some control of the on-ground thrust of the aircraft. For example, in icy conditions, the ground thrust of an engine may overcome braking forces and cause the aircraft to skid. The translatable structure 30 may be moved into the second operational position to direct at least a portion of the exhaust gases in generally forward and outward directions to reduce the risk of skidding.

In an exemplary embodiment, the actuation system 80 may include a control system that is fully integrated with the engine computer and to the aircraft flight controls.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of directing the flow of gases in a two-dimensional exhaust nozzle assembly for an engine, the method comprising:
    a) translating a translatable structure between a plurality of operational positions relative to a pair of longitudinally extending sidewalls and a bottom wall of an exhaust duct having a flow diverting port therein, wherein the translatable structure is operable to open and close the flow diverting port, and wherein the plurality of operational positions includes a first operational position wherein the flow diverting port is effectively fully closed, a second operational position wherein the flow diverting port is effectively fully opened, and first intermediate position intermediate the first and second operational positions wherein the flow diverting port is effectively fully closed, and wherein the second operational position is generally rearward of the first operational position; and
    b) during at least a part of (a), varying a cross-sectional area of the exhaust duct at a throat constriction in the exhaust duct, wherein the throat constriction is at least partly defined by an inner portion of the translatable structure.

2. The method according to claim 1 further comprising:
    c) during at least a part of (b), varying a longitudinal position of the throat constriction.

3. The method according to claim 1 further comprising:
    c) during at least a part of (a), translating the translatable structure into the second operational position.

4. The method according to claim 1 further comprising:
    c) during at least a part of (a), translating the translatable structure into a second intermediate operational position generally rearward of the first intermediate operational position, wherein the flow diverting port is partly opened.

5. The method according to claim 1 wherein in (a), translating the translatable structure includes:
    utilizing an actuation system including at least one linear actuator adapted for linear movement along a line oriented at an angle relative to a longitudinally extending line.

6. The method according to claim 1 wherein in (b), varying the cross-sectional area includes decreasing the cross-sectional area during rearward translation of the translatable structure.

7. The method according to claim 1 wherein in (b), varying the cross-sectional area includes increasing the cross-sectional area during forward translation of the translatable structure.

8. The method according to claim 2 wherein in (c), varying the longitudinal position of the throat constriction includes at least displacing the throat constriction generally rearward during rearward translation of the translatable structure.

9. The method according to claim 2 wherein in (c), varying the longitudinal position of the throat constriction includes at least displacing the throat constriction generally forward during forward translation of the translatable structure.

10. A method of directing the flow of gases in a two-dimensional exhaust nozzle assembly for an engine, the method comprising:
   a) translating a translatable structure between a plurality of operational positions relative to a pair of longitudinally extending sidewalls and a bottom wall of an exhaust duct having a flow diverting port therein, wherein the translatable structure is operable to open and close the flow diverting port, and wherein the plurality of operational positions includes a first operational position wherein the flow diverting port is effectively fully closed and a second operational position wherein the flow diverting port is effectively fully opened;
   b) during at least a part of (a), translating the translatable structure from the first operational position to a first intermediate operational position intermediate the first and second operational positions wherein the flow diverting port is effectively fully closed;
   c) during at least a part of (a), translating the translatable structure into a second intermediate operational position intermediate the first and second operational positions wherein the flow diverting port is partly opened; and
   d) during at least a part of (b), varying a longitudinal position of a throat constriction in the exhaust duct.

11. A method of directing the flow of gases in a two-dimensional exhaust nozzle assembly for an engine, the method comprising:
   a) translating a translatable structure between a plurality of operational positions relative to a pair of longitudinally extending sidewalls and a bottom wall of an exhaust duct having a flow diverting port therein, wherein the translatable structure is operable to open and close the flow diverting port, and wherein the plurality of operational positions includes a first operational position wherein the flow diverting port is effectively fully closed and a second operational position wherein the flow diverting port is effectively fully opened;
   b) during at least a part of (a), translating the translatable structure from the first operational position to a first intermediate operational position intermediate the first and second operational positions wherein the flow diverting port is effectively fully closed;
   c) during at least a part of (a), translating the translatable structure into a second intermediate operational position intermediate the first and second operational positions wherein the flow diverting port is partly opened; and
   d) during at least a part of (b), varying a cross-sectional area of the exhaust duct at the throat constriction.

12. A method of directing the flow of gases in a two-dimensional exhaust nozzle assembly for an engine, the method comprising:
   a) translating a translatable structure between a plurality of operational positions relative to a pair of longitudinally extending sidewalls and a bottom wall of an exhaust duct having a flow diverting port therein, wherein the translatable structure is operable to open and close the flow diverting port, and wherein the plurality of operational positions includes a first operational position wherein the flow diverting port is effectively fully closed and a second operational position wherein the flow diverting port is effectively fully opened;
   b) during at least a part of (a), translating the translatable structure into a first intermediate operational position intermediate the first and second operational positions wherein the flow diverting port is effectively fully closed; and
   c) during at least a part of (a), varying a cross-sectional area of the exhaust duct at a throat constriction, wherein the throat constriction is at least partly defined by an inner portion of the translatable structure.

* * * * *